United States Patent [19]

Dayan et al.

[11] Patent Number: 5,557,784
[45] Date of Patent: Sep. 17, 1996

[54] POWER ON TIMER FOR A PERSONAL COMPUTER SYSTEM

[75] Inventors: Richard A. Dayan, Boca Raton, Fla.; Chris Dombrowski, Apex, N.C.; James F. Mascaro, Lexington, S.C.

[73] Assignee: International Business Machines Corporation, Armonk, N.Y.

[21] Appl. No.: 413,313

[22] Filed: Mar. 30, 1995

[51] Int. Cl.$^6$ .............................. G06F 1/14; G06F 11/34
[52] U.S. Cl. ............................................................. 395/550
[58] Field of Search .................................. 395/550, 557, 395/650, 700, 750

[56] References Cited

U.S. PATENT DOCUMENTS

| | | | |
|---|---|---|---|
| 4,035,627 | 7/1977 | Dickinson | 235/156 |
| 4,168,525 | 9/1979 | Russell | 364/569 |
| 4,322,831 | 3/1982 | Peterson | 368/46 |
| 4,466,074 | 8/1984 | Jindrick | 364/569 |
| 4,766,567 | 8/1988 | Kato | 364/900 |
| 4,804,957 | 2/1989 | Selph | 340/870.03 |
| 5,307,480 | 4/1994 | Hwang | 395/575 |

OTHER PUBLICATIONS

IBM TDB, vol. 30, No. 1., Jun. 1987, pp. 193–194, "Loop Power-On-Self Test Diagnostics".

*Primary Examiner*—Thomas M. Heckler
*Attorney, Agent, or Firm*—Anthony N. Magistrale

[57] ABSTRACT

This disclosure relates to a method and apparatus for measuring the amount of time a personal computer system is powered on. A power on time (POT) routine is performed at a power on of the computer system. This routine sets up a timer to count the number of pre-selected time units (selected by a user) the system is powered on. The power on time count is stored in the PC's non-volatile memory. The routine sets an alarm field of the system's real time clock (RTC) to be activated after the pre-selected time unit has elapsed. A POT interrupt handler routine is installed in a chain for RTC interrupts and is invoked each time the alarm is activated (i.e., at each passage of the pre-selected time unit) while the system is powered on. When invoked, the POT interrupt handler routine increments the POT count and resets the RTC alarm to be activated after another pre-selected time unit has elapsed.

31 Claims, 13 Drawing Sheets

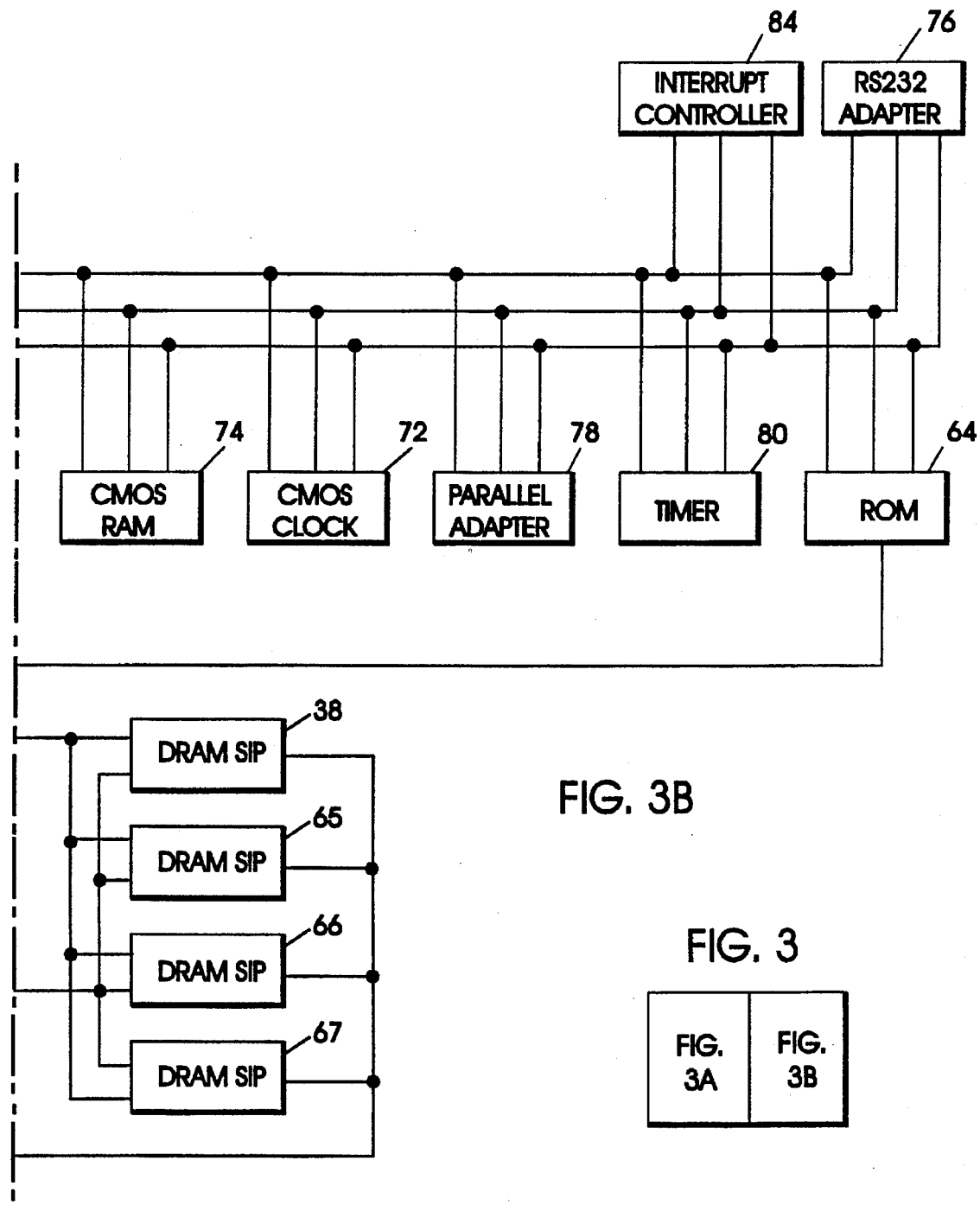

POWER ON TIMER FOR A PERSONAL COMPUTER SYSTEM

BACKGROUND OF THE INVENTION

1. Field of the Invention

This disclosure relates to personal computer systems and more particularly to a power on timer that can be used to measure or record the amount of time a personal computer system is powered on.

2. Description of Related Art

Personal computer (PC) systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more electromechanical direct access storage devices (DASD), and an optional printer. One of the distinguishing characteristics of these systems is the use of a motherboard or system planar board to electrically connect these components. These systems are designed primarily to give independent computing power to a single user and are inexpensively priced for purchase by individuals or small businesses. Examples of such personal computer systems are IBM's Personal Computer AT and IBM's Personal System/2 Models 25, 30, 50, 60, 70 and 80. Personal computers occasionally encounter intermittent errors. An intermittent error is an error that is detectable but not repeatable by known means. When diagnosing intermittent problems, it is helpful to learn the amount of time between intermittent problems. The time that is useful is not the total elapsed time on a clock between the two events, but the amount of use or time the system is powered-on between the two events. This power-on-time (POT) can be very helpful to service personnel in debugging intermittent problems which cannot be readily reproduced due to its cause being unknown. The power-on-time is also helpful for estimating service costs and the mean time between failure values for the PC system.

There are two methods that can be used to obtain the POT. One is a separate power-on-time meter, similar to those used on computer mainframes such as an IBM 3970. The second is to physically time the power-on-time manually. In the cost competitive environment that personal computers are marketed, the use of a separate POT meter is not practical. Currently, there are no PCs in the industry with power-on-time meters, so the extra cost of a meter will make a PC having such a meter non-competitive. The second method of manually timing the systems power-on-time is not practical or reliable. The duration between events may be on the order of weeks or months. Using manual logs to track the power-on-time in most cases will be unreliable. People forget to log in or just don't do it. Bear in mind that a single PC can be available to many users, which compounds the problem of manual logging of usage.

It is therefore desirable to provide a reliable and inexpensive power-on-time meter that can be integrated into current PCs to perform the function of a hardware power-on-time meter.

SUMMARY OF THE INVENTION

The present invention is directed to a method and apparatus for measuring the amount of time a personal computer system is powered on. A power on time (POT) routine is performed at a power on of the computer system. This routine sets up a timer to count the number of pre-selected time units the system is powered on. The routine sets an alarm field of the system's real time clock (RTC) to be activated after the pre-selected time unit has elapsed. A POT interrupt handler routine is installed in a chain for RTC interrupts and is invoked each time the alarm is activated (i.e., at each passage of the pre-selected time unit) while the system is powered on. When invoked, the POT interrupt handler routine increments the POT count and resets the RTC alarm to be activated after another pre-selected time unit has elapsed. The pre-selected time unit is set by a user and the POT count of pre-selected time units is stored in non-volatile memory so that it will not be lost or erased when the system 10 is powered off.

In accordance with one embodiment of the present invention, the POT routine can be disposed within the PC's power on self test (POST) routine. At power on POST performs its normal system configuration check and device initialization. Next, the routine checks whether the POT meter routine has been enabled and initialized. If the meter is enabled and initialized, the routine will set the RTC alarm to activate after a pre-selected time unit has elapsed at which time the POT interrupt handler routine will be entered. Depending on whether the pre-selected time unit is in seconds, minutes or hours, POST will execute a POT(seconds) routine, a POT(minutes) routine or a POT(hours) routine in order to set the RTC to be activated after a pre-selected amount of seconds, minutes or hours respectively.

After executing any one of the three routines, a logic one is written into the AlE field (bit 5) of Register B (RTC location Bh) to enable the interrupt from the RTC when the time of day matches or satisfies the alarm values. Next, the routine then installs a POT interrupt handler in the chain for the RTC interrupt. Then the RTC interrupt is enabled in the programmable interrupt controller (PIC). The RTC alarm feature will activate a RTC interrupt every granularity cycle, starting with the first granularity cycle after powering up the system. The POT interrupt handler is installed by POST in order to update the POT count in the non-volatile memory after each pre-selected time unit has elapsed. Next, the operating system is booted.

The POT interrupt handler is invoked each time the alarm is activated (i.e., at each passage of the pre-selected time unit) while the system is powered on. When invoked, the POT interrupt handler routine increments the POT count and resets the RTC alarm to be activated after another pre-selected time unit has elapsed. The POT interrupt handler routine checks the AF field (bit 5) of register C (RTC location Ch) for an active alarm condition. If the alarm is active, the routine increments the POT count by one. Depending on whether the pre-selected time unit is in seconds, minutes or hours, the POT interrupt handler will execute the POT(seconds) routine, the POT(minutes) routine or the POT(hours) routine in order to set the RTC to be activated after another pre-selected time unit (in seconds, minutes or hours respectively) has elapsed at which time the POT interrupt handler routine will be entered again. This will continue until power is turned off in order to obtain the POT count for the particular computer session.

In accordance with the present invention, the set configuration utility is modified to provide a user with a screen oriented user interface to the user of the computer system 10. The set configuration utility will allow the user to perform the following functions; 1) select the pre-selected time unit (type and size), 2) reset the POT meter (zero POT count), 3)

enable the POT meter, 4) terminate or disable the POT meter, 5) display the current POT meter value (POT count or total power on time), 6) write the POT meter (store a predetermined POT count), 7) suspend metering and 8) resume metering.

In another embodiment of the present invention, a terminate and stay resident (TSR) program can provide the POT meter functions to those computer systems which do not come equipped with a POT meter integrated into POST. The operation of the TSR POT meter is very similar to the operation to the first embodiment except for the differences that will be described below.

The TSR program will be copied onto a disk of the computer system 10. For a media-less system, (a system without a disk and diskette) the program will be copied into the media-less workstation partition on its associated server. In order to invoke the program automatically, the program's name is inserted into the AUTOEXEC.BAT file in the root directory of the boot disk. (For the media-less system the program's name is inserted into the AUTOEXEC.BAT file on the media-less workstation partition on its associated server.) This will automatically invoke the program every time the system is powered on. This ensures an accurate record of elapsed time.

In accordance with this embodiment of the present invention, a POT routine can be disposed within TSR program. The TSR program can initiate and establish a power-on-time (POT) meter to automatically keep track of power on time until canceled by a user. At power on, after the operating system is booted the TSR routine checks whether the POT meter has been enabled. If the meter is enabled, the TSR routine will follow steps identical to those described with regard to the first embodiment. In summary, these steps are used by the program to set up a timer using the alarm feature of the RTC in order to count the number of pre-selected time units the system is used (powered on) which is stored in non-volatile memory. The RTC alarm feature will activate an RTC interrupt (POT interrupt handler) every granularity cycle once initialized starting with the first, after powering up the system. After this is completed, the TSR program will return execution to the operating system and the program will stay resident.

The TSR program also provides a POT interrupt handler routine (identical to the POT interrupt handler routine for the first embodiment) in order to update the POT count. The program will chain the interrupt handler into the existing chain of interrupt handlers for the RTC. The POT interrupt handler is invoked each time the alarm is activated (i.e., at each passage of the pre-selected time unit) while the system is powered on. When invoked, the POT interrupt handler routine increments the POT count and resets the RTC alarm to be activated after another pre-selected time unit has elapsed so that the POT interrupt handler will be entered each granularity cycle to update the POT count accordingly.

The TSR POT meter program can provide a POT meter menu. The POT meter menu provides the user of this embodiment with a screen oriented user interface to allow the user to perform the same seven options as described above for the first embodiment.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
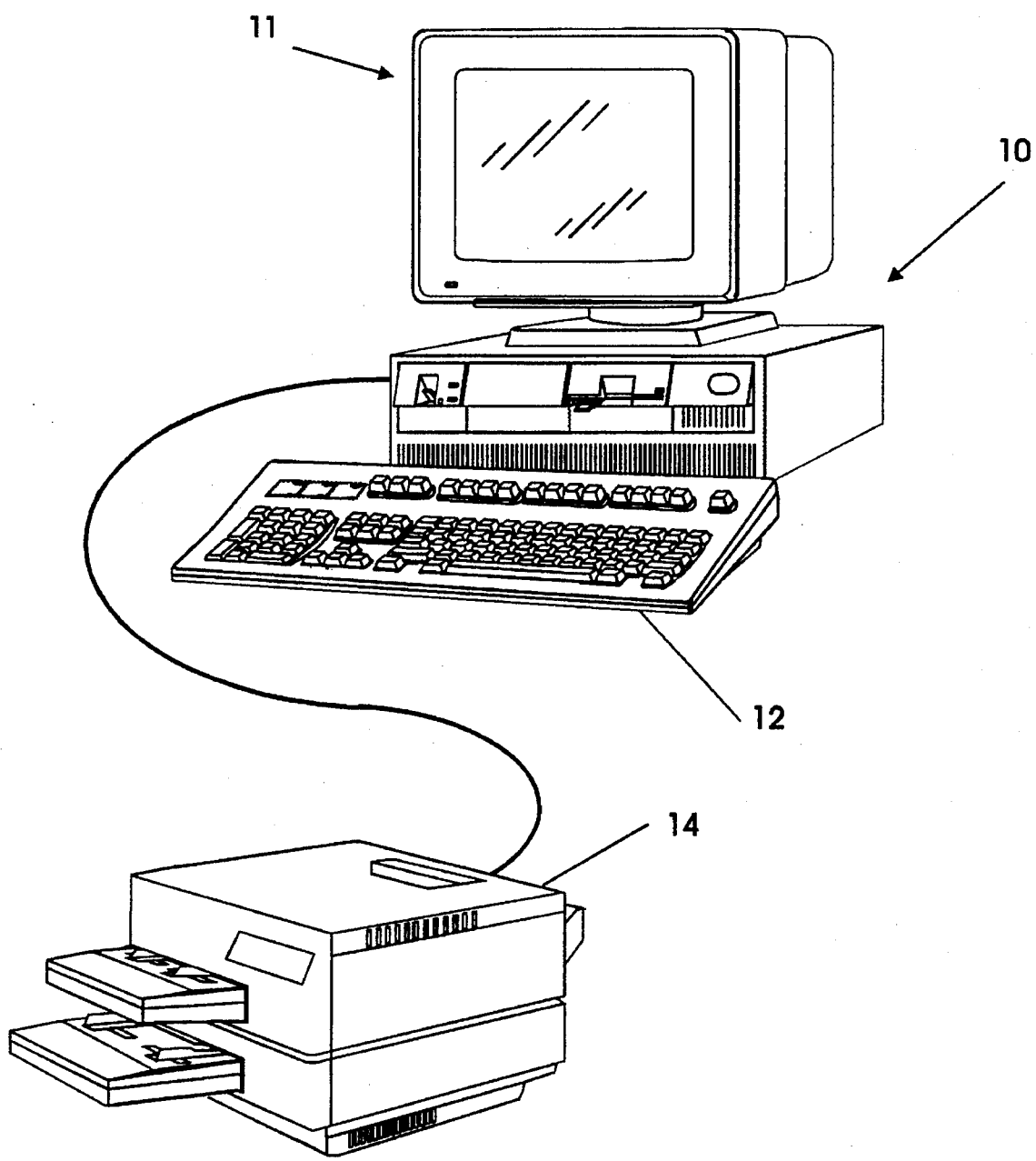
FIG. 1 is a perspective view of a personal computer embodying this invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a planar 20 which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
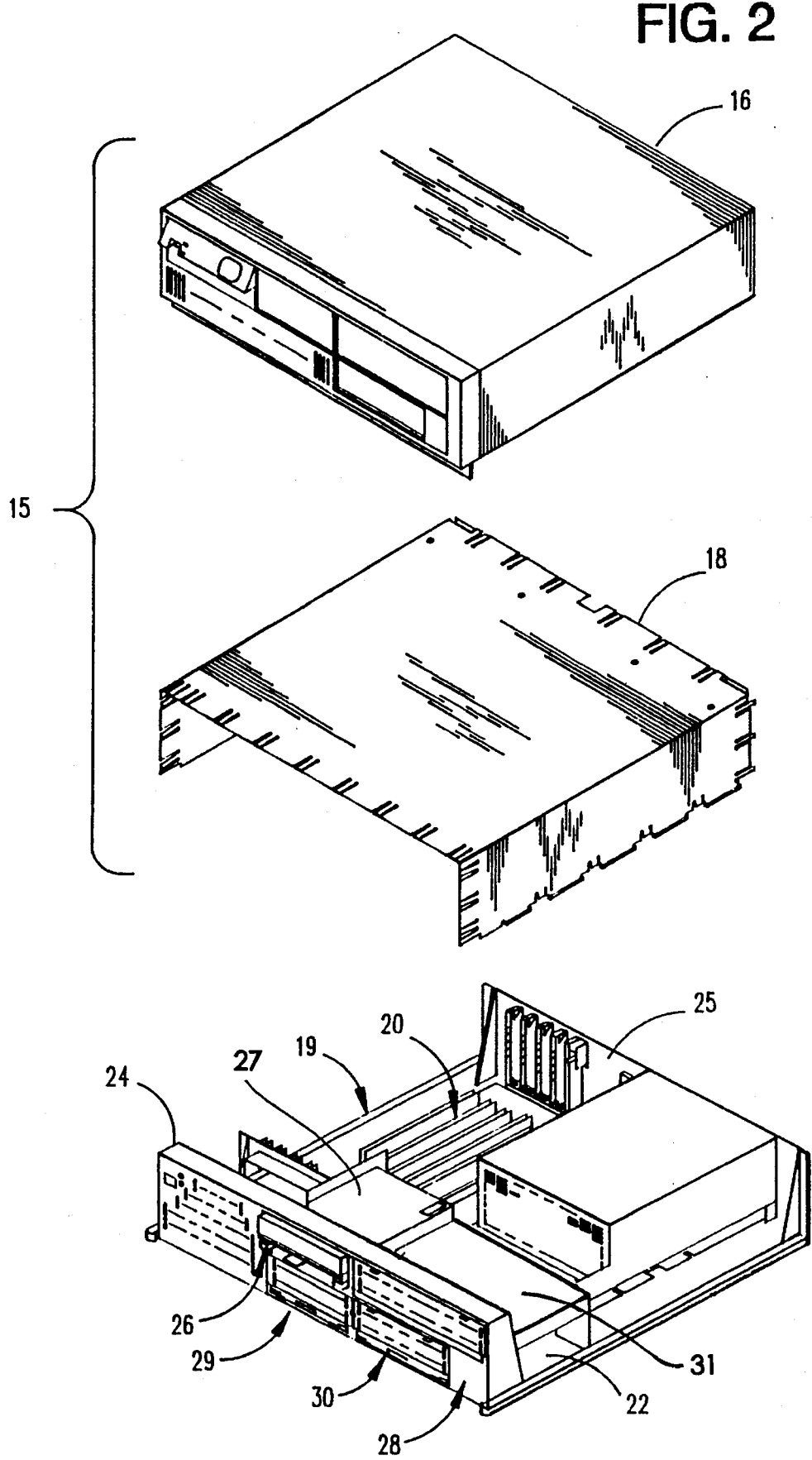
FIG. 2 is an exploded perspective view of certain elements of the personal computer of FIG. 1 including a chassis, a cover, an electromechanical direct access storage device and a planar board, and illustrating certain relationships among those elements FIGS. 3A and 3B, connected as shown in FIG. 3, are a block diagram of certain components of the personal computer of FIGS. 1 and 2, FIGS. 4A and 4B are a flow chart showing the details of the POT power up routine of the present invention.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 27 in FIG. 2, and can be a removable medium direct access storage device capable of receiving a diskette inserted thereinto and using the diskette to receive, store and deliver data as is generally known. One hard disk drive is indicated at 31 and is a fixed medium direct access storage device capable of storing and delivering data as is generally known.

Figure 3A:
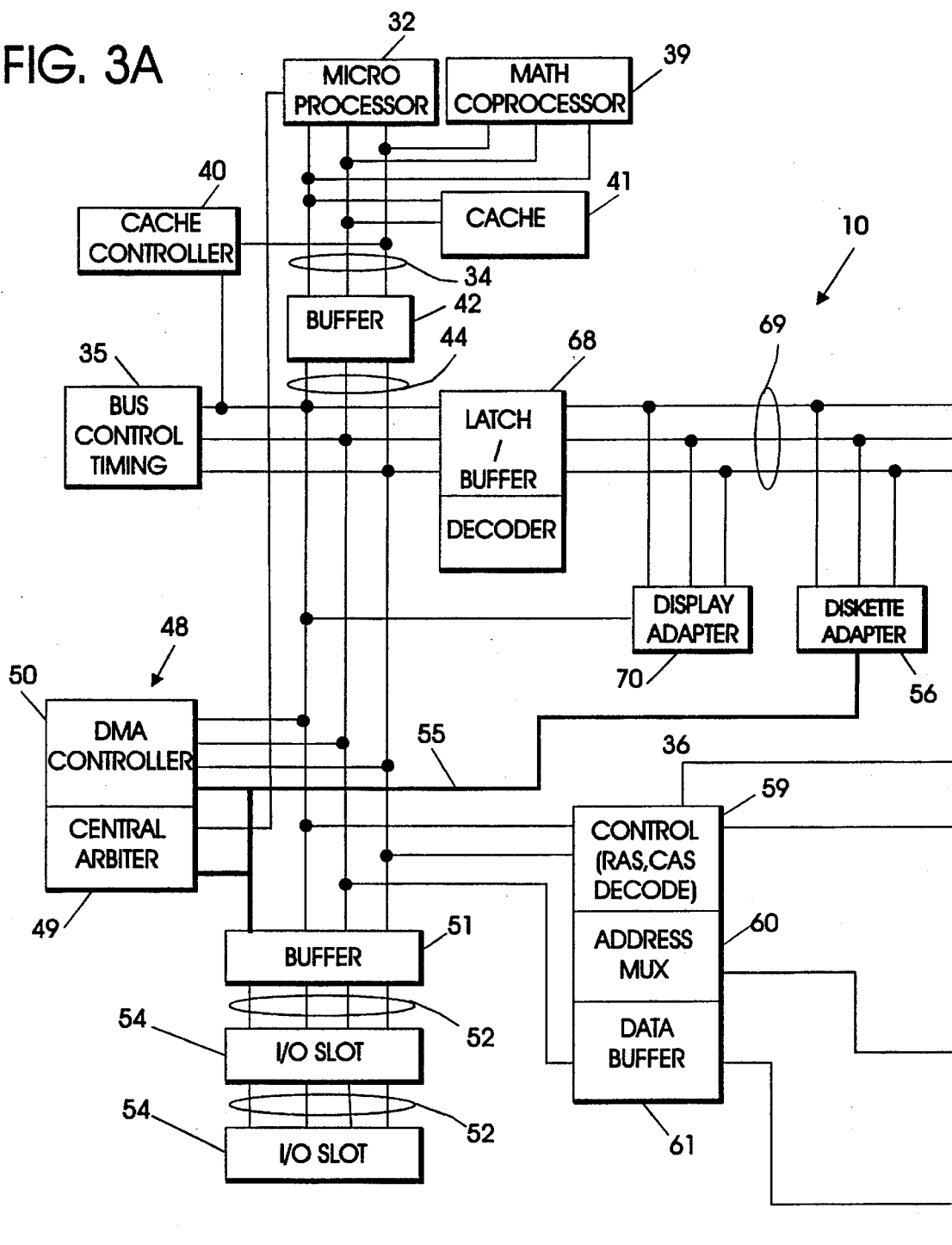

Prior to relating the above structure to the present invention, a summary of the operation in general of the personal computer system 10 may merit review. Referring to FIGS. 3A and 3B, there is shown a block diagram of a personal computer system illustrating the various components of the computer system 10 in accordance with the present invention. FIGS. 3A and 3B further illustrates components mounted on the planar 20 and the connection of the planar to the I/O slots and other hardware of the personal computer system 10. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIGS. 3A and 3B, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIGS. 3A and 3B, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 51. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the Micro Channel or industry standard architecture (ISA) bus 52. Connected to the bus 52 are a plurality of I/O slots 54 for receiving Micro Channel (ISA) adapter cards which may be further connected to an I/O or peripheral device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexer 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic can be used to reclaim RAM previously occupied by BIOS. Further generated by memory controller 36 is a ROM select signal (ROMSEL), that is used to enable or disable ROM 64.

While the microcomputer system 10 is shown with a basic one megabyte RAM module 38, it is understood that additional memory can be interconnected as represented in FIGS. 3A and 3B by the optional memory modules 65 through 67. For purposes of illustration only, the present invention is described with reference to the basic one megabyte memory module 38.

A latch buffer 68 and an associated decoder are coupled between the system bus 44 and a planar I/O bus 69. The planar I/O bus 69 includes address, data, and control components respectively. Coupled along the planar bus 69 are a variety of I/O adapters and other components such as the display adapter 70 (which is used to drive the monitor 11), a CMOS or real time clock (RTC) 72, nonvolatile CMOS RAM 74 herein after referred to as NVRAM, a RS232 adapter 76, a parallel adapter 78, a timer 80, a diskette adapter 56, a programmable interrupt controller (PIC) 84, and a read only memory 64. The read only memory 64 includes the BIOS that is used to interface between the I/O devices and the operating system of the microprocessor 32. The BIOS includes diagnostic routines which are contained in a power on self test section referred to as POST and is used to test the major components of the personal computer system 10. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The real time clock 72 is used for time of day calculations and includes registers and locations which are well known to those of ordinary skill in the art of the present invention. While any appropriate real time clock can be used, one suitable RTC is the Dallas 1285 which is sold by Dallas Semiconductor.

NVRAM 74 is used to store system configuration data. That is, the NVRAM 74 will contain values which describe the present configuration of the system. For example, NVRAM 74 contains information describing the capacity of a fixed disk or diskette, the type of display, the amount of memory, etc. Of particular importance NVRAM 74 will contain data (can be one bit) which is used by the memory controller 36 to determine whether BIOS is run out of ROM or RAM and whether to reclaim RAM intended to be used by BIOS RAM. Furthermore, these data are stored in NVRAM 74 whenever a special configuration program, such as SET Configuration, is executed. The purpose of the SET Configuration program is to store values characterizing the configuration of this system to NVRAM 74 which are saved when power is removed from the system.

One embodiment of the present invention is directed to a power-on-time meter that can be integrated into the computer system 10. This meter is established by making some changes to the power on self test (POST) routine and the set configuration utility. POST is composed of diagnostic routines or modules contained in ROM 64 that test all the main system components at power-on (or reset) such as the CPU 32, ROM 64, memory 38, keyboard 12, display 11 and major peripherals such as a floppy or fixed disk drive. Whenever the computer system 10 is started up or reset, POST automatically performs a series of tests that check various components in the system 10. The set configuration utility is used to set configuration parameters and the time of day. The set configuration utility is invoked by either booting the system reference diskette or the system reference image from the system partition on the hard drive 31.

The POT meter of the present invention sets up a timer to count the number of pre-selected time units (granularity type and size set by a user) when the system 10 is powered on. The alarm feature of the RTC 72 already present in system 10 is used to create the timer. The alarm feature is enabled by setting the alarm field of the RTC to be activated after the pre-selected time unit has elapsed. A POT interrupt handler routine is installed in a chain for RTC interrupts for incrementing the POT count at each passage of the pre-selected time unit while the system is powered on to obtain a POT count of the pre-selected time units that the system has been powered on. The pre-selected time unit is set by a user and the POT count is stored in NVRAM 74 so that it will not be lost or erased when the system 10 is powered off. In addition, NVRAM 74 is used to store the pre-selected time unit (granularity size) and the pre-selected time unit type (granularity type, e.g., seconds, minutes or hours).

Figure 4A:
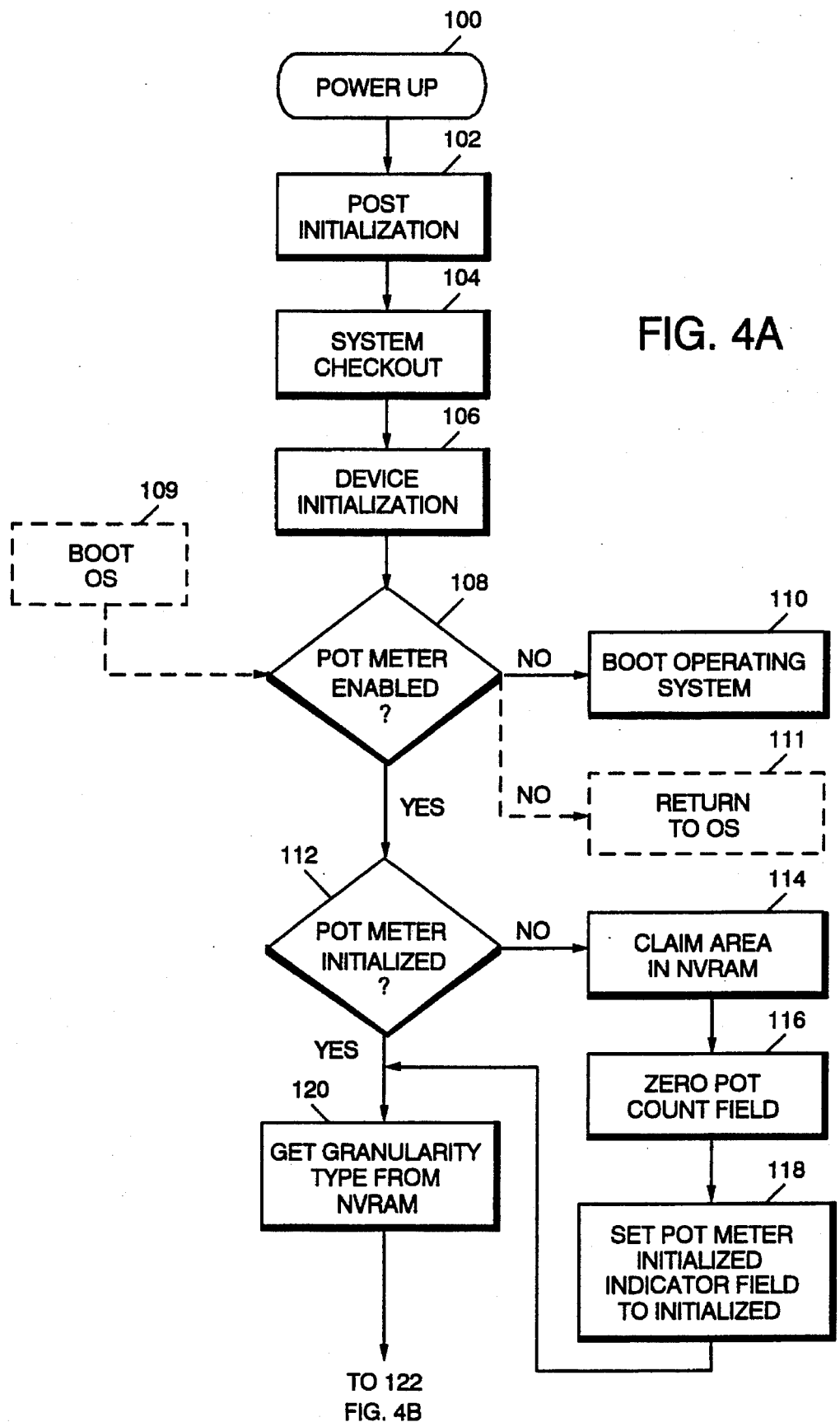
Figure 4B:
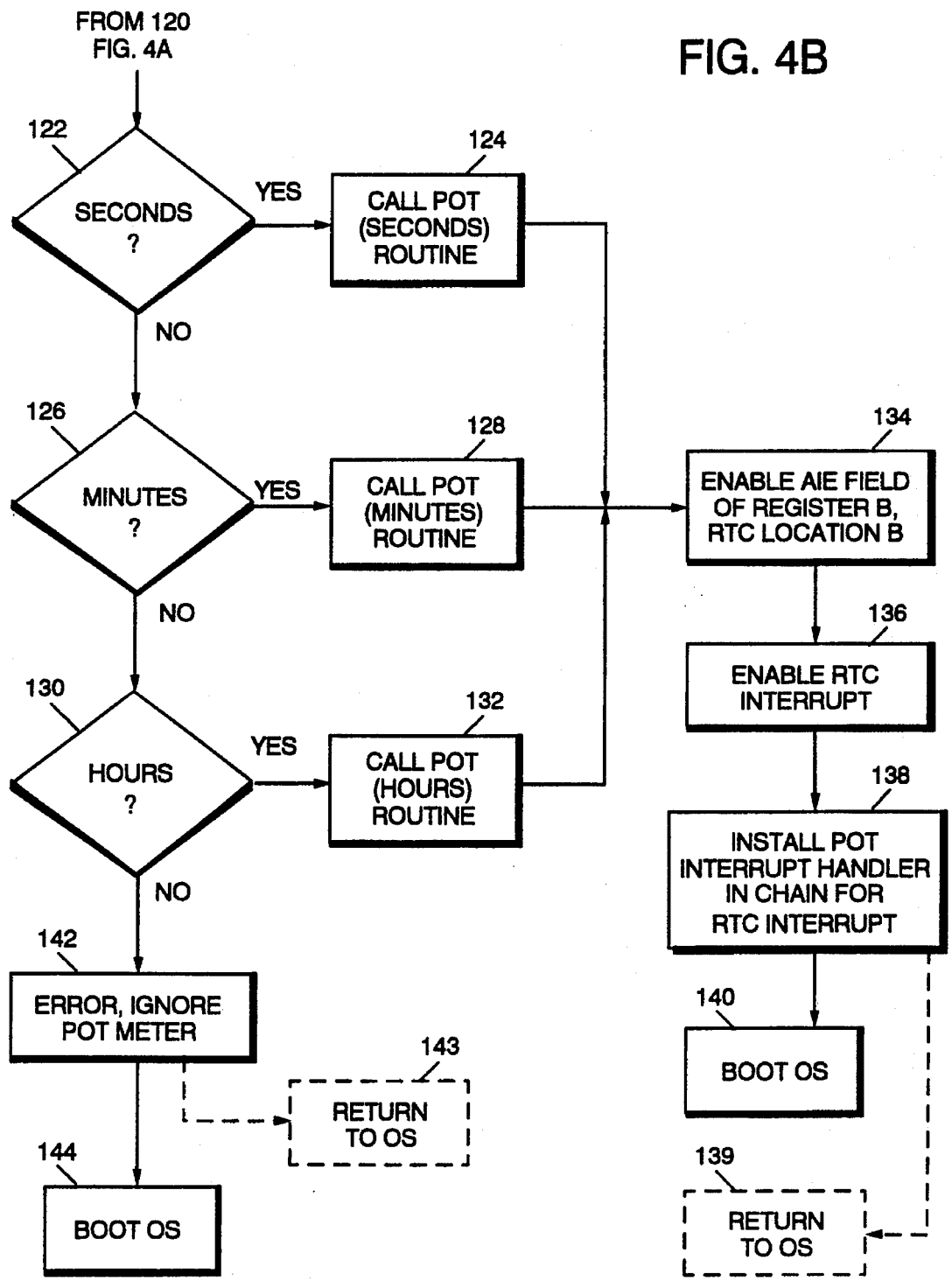

FIGS. 4A, 4B, 5-7 shows the procedure used by POST in accordance with one embodiment of the present invention to initiate and establish a power-on-time (POT) meter to automatically keep track of power on time until canceled by a user. Referring to FIGS. 4A and 4B, the POST routine starts at 100 each time the computer system 10 is powered up or reset. POST first tests the CPU 32 at step 102. In addition, the memory controller 36 is initialized by the POST routine. Next, POST tests and initializes all components of the system including system memory at step 104. After the memory is tested, various other devices are tested and initialized at 106. These devices include a video controller, UARTS, fixed disk drive, floppy disk drive, etc. Steps 100 through 106 are well known to those of ordinary skill in the art of the present invention and thus have only been generally outlined.

Next, the routine checks whether the POT meter has been enabled, at 108. If the meter is not enabled then the NO branch is taken from decision step 108 to step 110 where the operating system is booted in accordance with a well known boot routine, Int 19*h*. On the other hand if the meter is enabled, the YES branch is taken from step 108 to step 112 where the routine then branches depending on whether the meter has been initialized. If the meter has not been initialized then the NO branch is taken from step 112 to step 114 where the POST routine will claim a dynamic data area of NVRAM 74 which is used as the POT count field following an established convention. The POT count field is used to store the count of pre-selected time units chosen by a user that the system has been powered on. Since NVRAM 74 retains its contents when the system 10 is powered off, the count of power on time is cumulative until metering is terminated and the count is cleared.

After step 114 the routine proceeds to step 116 where the area in NVRAM 74 is cleared to zero (POT count=0). Next, a POT meter initialized indicator field is set to an initialized state, at step 118 to indicate to POST that metering is operational and valid. The POT meter initialized indicator field is a one bit field stored in NVRAM 74 and a logic one indicates an initialized state. After step 118, the routine proceeds to step 120. Step 120 can also be reached if the meter had already been initialized when the routine was in step 112. In that scenario, the YES branch is taken from decision step 112 directly to step 120.

The next several steps are used to set the RTC alarm to activate after a pre-selected time unit (granularity cycle) has elapsed at which time the POT interrupt handler routine will be entered. At 120 POST reads the granularity type from a granularity type filed in NVRAM 74. Depending on whether the granularity type is in seconds, minutes or hours, POST will execute a POT(seconds) routine (see FIG. 5 and accompanying text), a POT(minutes) routine (see FIG. 6 and accompanying text) or a POT(hours) routine (see FIG. 7 and accompanying text).

More specifically, POST proceeds from step 120 to decision step 122 (FIG. 4B) where it checks whether the granularity type is seconds. If the type is set to seconds, then execution proceeds to the POT(seconds) routine at 124. If the type was not set to seconds then the NO branch is taken from step 122 to 126 where the routine checks whether the granularity type is set to minutes. If the granularity type is set to minutes, then execution proceeds to the POT(Minutes) routine at 128. If the granularity type was not set to minutes then the NO branch is taken from step 126 to 130 where the routine checks whether the granularity type is set to hours. If the granularity type is set to hours, then execution proceeds to the POT(Hours) routine at 132.

After executing any one of the routines at steps 124, 128 or 132, the routine proceeds to 134 where a logic one is written into the AlE field (bit 5) of Register B (RTC location Bhex (Bh)) in order to enable the RTC interrupt when the time fields match the alarm fields. Next, the RTC interrupt is enabled in the programmable interrupt controller (PIC) 84, at 136. The RTC interrupt is associated with IRQ8. The routine proceeds to step 138 where it installs a POT interrupt handler in the chain for the RTC interrupt. The POT interrupt handler is installed by POST in order to update the POT count in NVRAM 74 after each granularity cycle has elapsed (see FIG. 6 and accompanying text). Steps 136 and 138 will cause the RTC alarm feature to activate a RTC interrupt every granularity cycle, starting with the first granularity cycle after powering up the system 10. For example, if the user selected a granularity of 10 seconds, the RTC interrupt will be activated every ten seconds. (It should be noted that smaller granularity sizes require more processing time due to more frequent interrupts which could degrade system throughput.) The routine then proceeds to step 140 where the operating system is booted in accordance with a well known boot routine (Int 19*h*).

Referring back to step 130, if the granularity type was not set to hours then the NO branch is taken from 130 to 142 where an error is generated and the POT meter is ignored. There must be an error here since to reach step 142 means that the POT meter was enabled and initialized but there was no granularity type specified. However, in order for the meter to be enabled and initialized a user must have selected a granularity type (see FIG. 10 and accompanying text). Next, the operating system is booted, at 144.

Figure 5:
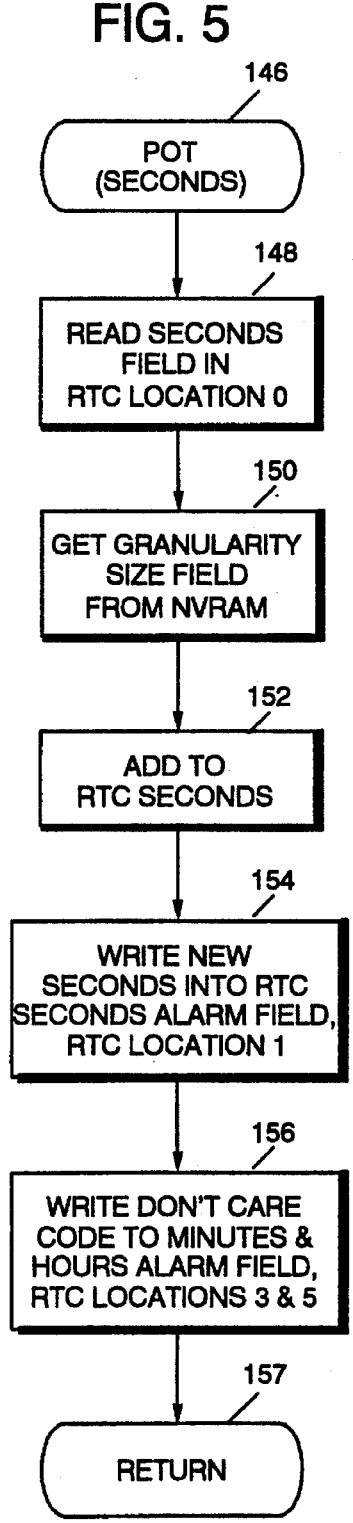
FIG. 5 is a flow chart showing the details of the POT-(seconds) routine of the present invention.

Referring now to FIG. 5, there is shown a flow chart of the POT(seconds) routine 146 which sets the RTC alarm to "go off" after the amount of seconds (chosen by the user and stored in the granularity size field) have elapsed. First the routine proceeds to step 148 where the current seconds field of the RTC is read from RTC location 0. Execution proceeds to step 150 where the granularity size field is obtained from NVRAM 74. The granularity size (in seconds) is then added to the RTC seconds field in step 152 to obtain a sum which is the time that the alarm will be set to "go off". The sum is then written into the seconds alarm field, RTC location 1 in step 154. The routine proceeds to step 156 where it writes a don't care code (e.g., FFh) into the RTC minutes and hours alarm field, RTC locations 3 and 5. Next, the routine returns (step 157) to the routine of FIGS. 4A and 4B, and will proceed to step 134 as described above.

Figure 6:
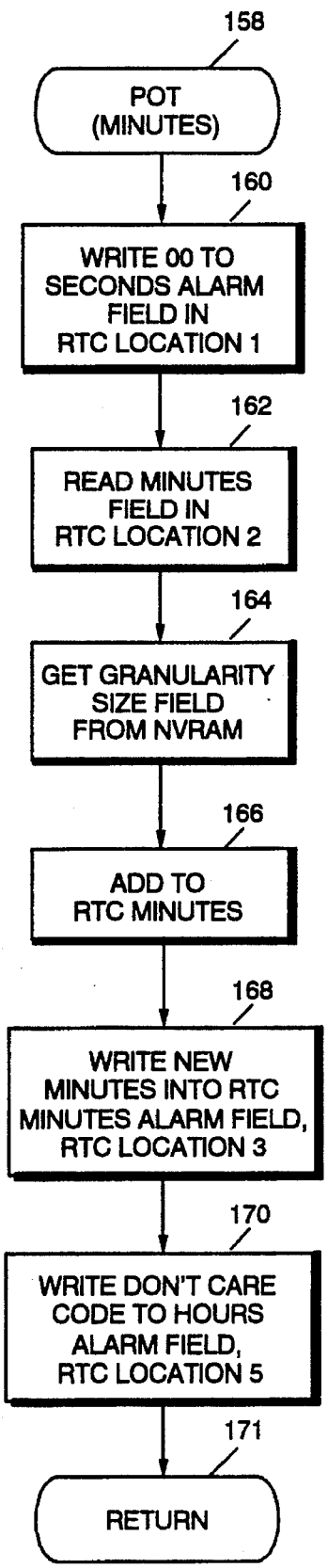
FIG. 6 is a flow chart showing the details of the POT-(minutes) routine of the present invention.

Referring now to FIG. 6, there is shown a flow chart of the POT(minutes) routine which begins at 158 and is used to set the RTC alarm to "go off" after the amount of minutes (chosen by the user and stored in the granularity size field) have elapsed. First the routine proceeds to step 160 where 00 is written to the seconds alarm field in RTC location 1. Next, the minutes field of the RTC is read from RTC location 2, at 162. Execution proceeds to step 164 where the granularity size field is obtained from NVRAM 74. The granularity size (in minutes) is then added to the RTC minutes field in step 166 to obtain a sum which is the time that the alarm will be set to "go off". The sum is then written into the RTC minutes alarm field, RTC location 3 in step 168. Next, a don't care code (e.g., FFh) is written into the RTC hour alarm field, RTC location 5, at 170. The routine then returns to FIGS. 4A and 4B, at 171.

Figure 7:
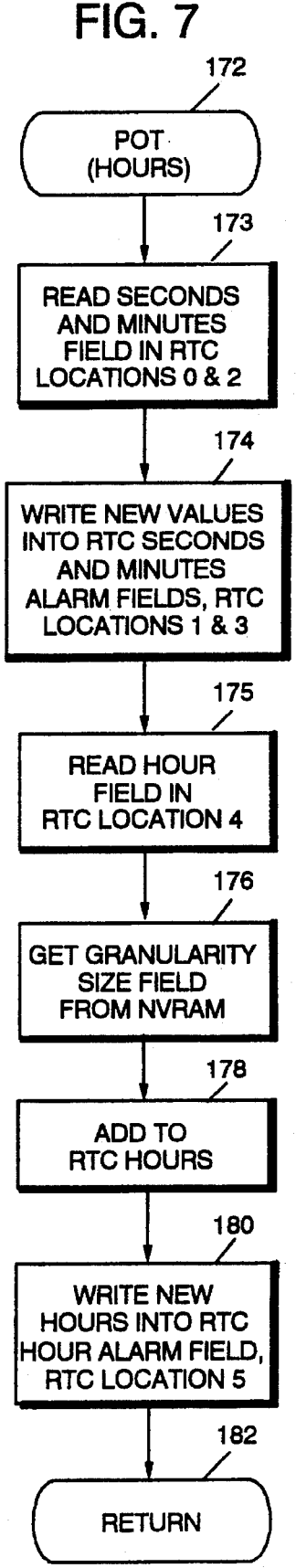
FIG. 7 is a flow chart showing the details of the POT(hours) routine of the present invention.

Referring now to FIG. 7, there is shown a flow chart of the POT(hours) routine which begins at 172 and is used to set the RTC alarm to "go off" after the amount of hours (chosen by the user and stored in the granularity size field) have elapsed. First the routine proceeds to step 173 where the seconds and minutes field of the RTC are read from RTC locations 0 and 2 respectively. Next, the values read in step 173 are written to the seconds and minutes alarm fields in RTC locations 1 and 3 respectively, at step 174. The routine proceeds to step 175 where the hours field of the RTC is read from RTC location 4. Execution proceeds to step 176 where the granularity size field is read from NVRAM 74. The granularity size (in hours) is then added to the RTC hours field in step 178 to obtain a sum which is the time that the alarm will be set to "go off". The sum is then written into the RTC hours alarm field, RTC location 5, at 180. The POT(hours) routine then returns to FIGS. 4A and 4B, at 182. If metering is enabled, one of the above routines will be executed at every system power up from a power off state.

Figure 8:
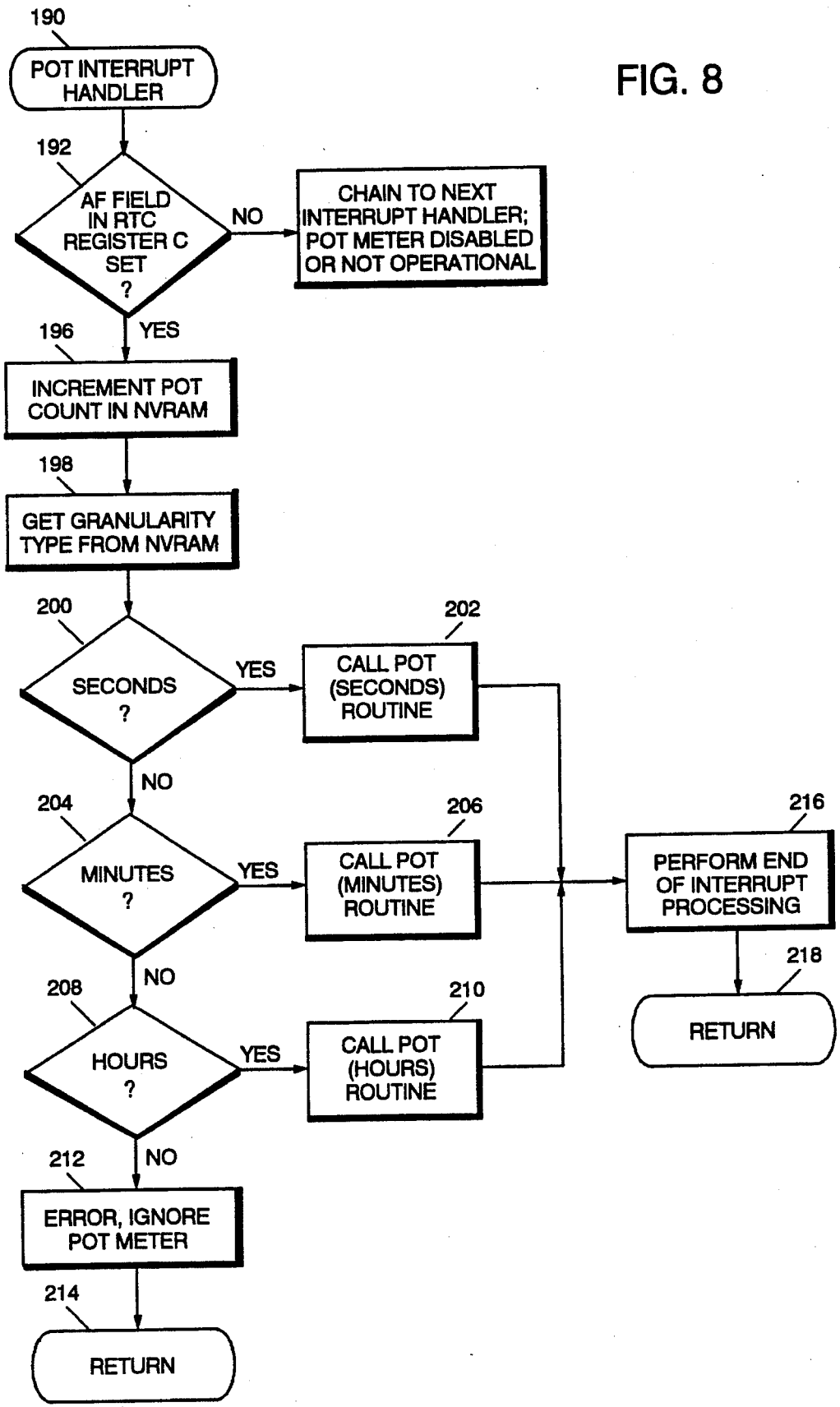
FIG. 8 is a flow chart showing the details of the POT interrupt handler routine of the present invention.

As mentioned above, in order to update the POT count in NVRAM 74, POST will install a POT interrupt handler. POST will chain the POT interrupt handler into the existing chain of interrupt handlers for the RTC. The POT interrupt handler routine is stored in ROM 64 and will be invoked at each granularity cycle to increment the POT count after each granularity cycle has elapsed and to set up the next alarm interrupt. Turning now to FIG. 8, there is shown a flow chart of the POT interrupt handler. The POT interrupt handler routine begins at 190 after each granularity cycle has elapsed (i.e., each time the RTC interrupt is activated). The routine proceeds to step 192 where it will check the AF field (bit 5) of register C, RTC location Ch for an active alarm condition. If the alarm is not active (i.e., bit 5 is a logic 0), execution proceeds from step 192 to step 194 where the POT interrupt handler will relinquish control of the processor 32 to the next interrupt handler in the chain for the RTC or return to the location it was in before it entered the interrupt handler if no chain exists.

If the alarm is active (i.e., bit 5 is a logic 1), the routine will proceed from step 192 to step 196 where it will increment the POT count in NVRAM 74 by one. The next several steps are used to set the RTC alarm to activate after another granularity cycle (pre-selected time unit) has elapsed at which time the POT interrupt handler routine will be entered again. This will continue until power is turned off in order to obtain the POT count for the particular computer session. It should be noted that if power is turned off in the middle of a granularity cycle the POT count is not updated (i.e., the POT interrupt handler is not entered). For example, if the user selects a granularity cycle of 30 seconds and the system is powered on for 85 seconds, the POT count will only show a two count. Upon power on the POT count will still be two and the alarm will not increment the count until another 30 second period has elapsed.

Steps 198 through 212 of FIG. 8 are similar to steps 120 through 142 described above with regard to FIGS. 4A, 4B, 5–7 (POT power up). At 198, the POT interrupt handler reads the granularity type from a granularity type filed in NVRAM 74. Depending on whether the granularity type is in seconds, minutes or hours, the routine will execute the POT(seconds) routine (see FIG. 5), the POT(minutes) routine (see FIG. 6) or the POT(hours) routine (see FIG. 7).

More specifically, the routine proceeds from step 198 to decision step 200 where it checks whether the granularity type is seconds. If the type is set to seconds, then execution proceeds to the POT(seconds) routine at 202. If the type was not set to seconds then the NO branch is taken from step 200 to 204 where the routine checks whether the granularity type is set to minutes. If the granularity type is set to minutes, then execution proceeds to the POT(minutes) routine at 206. If the granularity type was not set to minutes then the NO branch is taken from step 204 to 208 where the routine checks whether the granularity type is set to hours. If the granularity type is set to hours, then execution proceeds to the POT(hours) routine at 210. After executing any one of the routines at steps 202, 206 or 210, the routine proceeds to step 216 where it performs end of interrupt processing and then returns (step 218) to the location it was at before it entered the interrupt handler.

Referring back to step 208, if the granularity type was not set to hours then the NO branch is taken from 208 to 212 where an error is generated and the POT meter is ignored. There must be an error here since to reach step 212 means that the POT meter was enabled and initialized but there was no granularity type specified. However, in order for the meter to be enabled and initialized a user must have selected a granularity type (see FIG. 10 and accompanying text). Next, the routine returns execution to the location it was at before it entered the interrupt handler.

Figure 16:
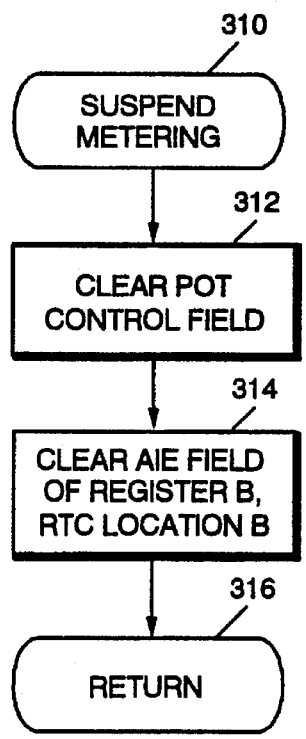
FIG. 16 is a flow chart showing the details of the suspend metering routine of the present invention.
Figure 17:
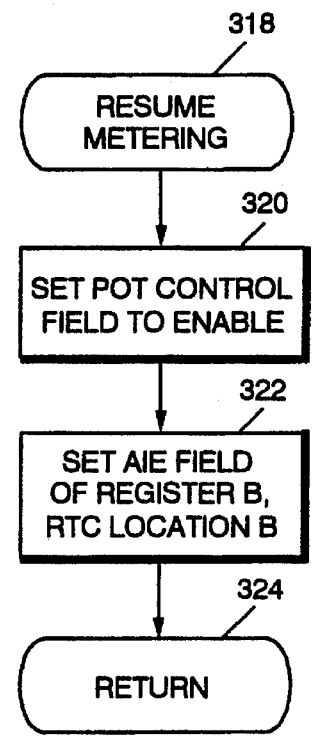
FIG. 17 is a flow chart showing the details of the resume metering routine of the present invention.

In accordance with the present invention, the set configuration utility is modified to provide a user with a screen oriented user interface to the user of the computer system 10. The set configuration utility will allow the user to perform the following functions; 1) select metering granularity (type and size) (FIG. 10), 2) reset the POT meter (FIG. 11), 3) enable the POT meter (FIG. 12), 4) terminate or disable the POT meter (FIG. 13), 5) display the current POT meter value (FIG. 14), 6) write the POT meter (FIG. 15), 7) suspend metering (FIG. 16), 8) resume metering (FIG. 17). Each function has a corresponding routine (FIGS. 10–17) which is stored on the hard drive 31 and transferred to DRAM 38 on power on.

Figure 9:
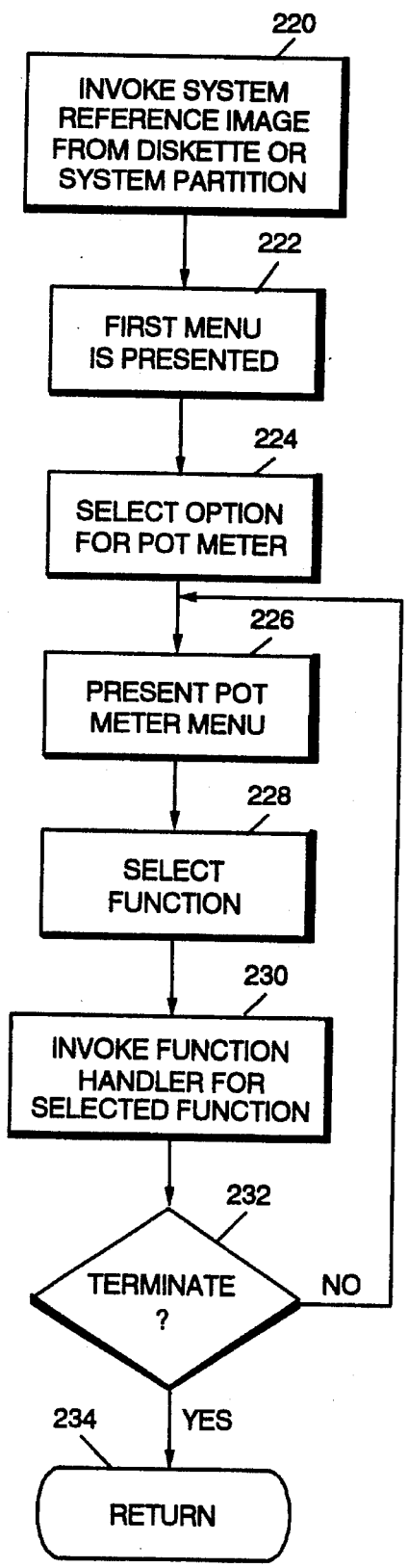
FIG. 9 is a flow chart showing the details of the set configuration utility of the present invention.

FIG. 9 shows a flow diagram of the set configuration utility. This utility is invoked by a user typically by booting the system reference diskette or the system reference image from the system partition (step 220). When booted by the user the system 10 will present a menu at step 222. The menu can have several selections one of which will be "POT Meter". The user can select the option for the POT meter at step 224 and the system will present the POT meter menu (step 226). At step 228 the user selects one of the eight functions listed above. Next, the function handler for the selected function is invoked at 230 (each of the function handlers are described below).

After executing the selected function handler, execution will return to decision block 232 to check whether the user has decided to terminate the POT meter utility. If the user does not terminate, the NO branch is taken to step 226 and execution proceeds as described above with regard to steps 226 through 232. If the user terminates, then the YES branch is taken to 234 where the routine returns to the set configuration utility.

The set configuration utility is used to control the integrated POT meter. When the user boots up the set configuration utility, the user should select the POT meter option. Once the option is selected, the user may select from among the eight options mentioned above. As also described above, the routine will proceed from step 230 of FIG. 9 to the particular function handler corresponding to the option selected by the user. The function handler flow charts for the eight options listed above are shown in FIGS. 10–16. It should be understood by those skilled in the art that the order of options described below is arbitrary and the user can independently select any one of the options.

One of the options is to select the metering granularity (type and size). This allows the user to select how often the POT meter is to be updated. The finer the granularity the more accurate the POT count will be. However, it should be noted that the smallest granularity is limited by the amount of time that the RTC is updated which is typically around 18 milliseconds. Thus, the granularity size can range from as small as 18 milliseconds to the longest range that the RTC will set an alarm. As noted above, the finer granularity requires more processing time (more frequent interrupts) and system throughput may be degraded. As also noted above, any fraction of the granularity cycle will be lost at the time of power off. For example, if the user selects a granularity of one hour and the system is powered on for one and one half hours the POT will only show a one count (one hour) and the extra half hour will not be recaptured on the next power on. The user should select the granularity type and size taking the above into consideration. It is preferred that only seconds, minutes or hours granularity will be selectable by the user.

Figure 10:
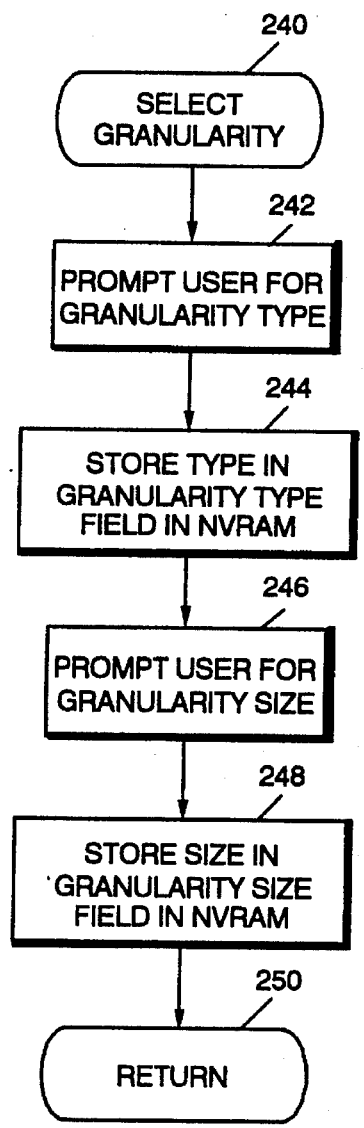
FIG. 10 is a flow chart showing the details of the select granularity routine of the present invention.

Referring now to FIG. 10, if the user selects this option the routine will proceed from step 240 to step 242 where the user is prompted to enter a granularity type (seconds, minutes or hours). Next, the entered granularity type is stored in a granularity type field in NVRAM 74, at 244. The user is then prompted to enter a granularity size, at 246. Next, the entered granularity size is stored in the granularity size field in NVRAM at 248. The routine then returns to a point just after block 230 of FIG. 9. as shown at step 250. The granularity type and size are entered by a user on an input device such as keyboard 12.

Figure 11:
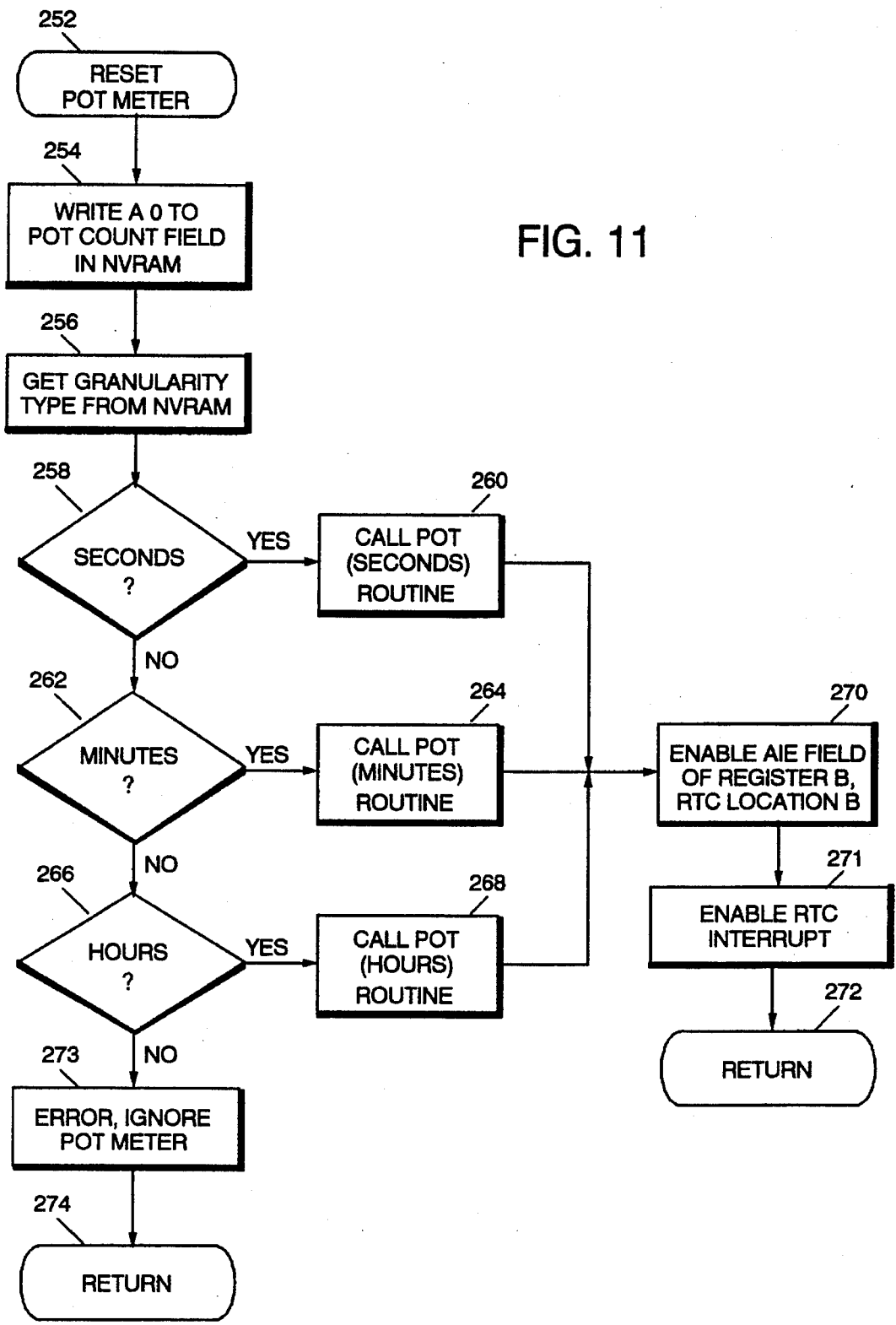
FIG. 11 is a flow chart showing the details of the reset POT meter routine of the present invention.

Another user selectable option is the reset option that will allow a user to reset the meter, once enabled. This utility resets the POT count in NVRAM 74 to zero. It also resets the alarm locations in the RTC so that the next alarm interrupt is in the actual length of time specified by the user's choice of granularity size. After this option is completed, the meter remains initialized and enabled. Turning now to FIG. 11 there is shown a flow chart for the reset option. The routine will proceed from step 252 to step 254 where a logic 0 will be written to the POT count field in NVRAM 74. Next, at 256 the granularity type is read from the granularity type field in NVRAM 74. Depending on whether the granularity type is in seconds, minutes or hours, this routine will execute the POT(seconds) routine (see FIG. 5), the POT(minutes) routine (see FIG. 6) or the POT(hours) routine (see FIG. 7).

More specifically, execution proceeds from step 256 to decision step 258 where it checks whether the granularity type is seconds. If the type is set to seconds, then execution proceeds to the POT(seconds) routine at 260. If the type was not set to seconds then the NO branch is taken from step 258 to 262 where the routine checks whether the granularity type is set to minutes. If the granularity type is set to minutes, then execution proceeds to the POT(Minutes) routine at 264. If the granularity type was not set to minutes then the NO branch is taken from step 262 to 266 where the routine checks whether the granularity type is set to hours. If the granularity type is set to hours, then execution proceeds to the POT(Hours) routine at 268.

After executing any one of the routines at steps 260, 264 or 268 the routine proceeds to 270 where a logic one is written into the AIE field (bit 5) of Register B (RTC location Bh) to enable the RTC interrupt when the time of day fields meet the conditions set in the RTC alarm fields. Next, the RTC interrupt is enabled in the programmable interrupt controller 84, at 271 in order for the POT interrupt handler routine (installed in the chain for the RTC interrupt during the power up routine of FIGS. 4A and 4B) to be invoked after each granularity cycle has elapsed. The routine then returns to the POT meter menu at step 232 as shown at step 272.

Referring back to step 266, if the granularity type was not set to hours then the NO branch is taken from 266 to 273 where an error is generated and the POT meter is ignored. There must be an error here since to reach step 273 means that the POT meter was enabled and initialized but there was no granularity type specified. However, in order for the meter to be enabled and initialized a user must have selected a granularity type (see FIG. 10 and accompanying text). Next, the routine returns execution to the POT meter menu (step 232) at step 274.

It should be understood by those skilled in the art that as an alternative to having the POT (seconds, minutes and hours) subroutines which can be executed from the power up routine (FIGS. 4A and 4B), POT interrupt handler routine (FIG. 8) or the reset POT meter routine (FIG. 11), each of the subroutine can be directly written into the routines of FIGS. 4A, 4B, 8 and 11.

Figure 12:
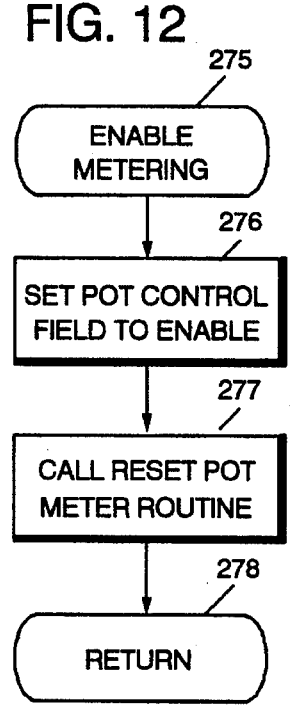
FIG. 12 is a flow chart showing the details of the enable metering routine of the present invention.

The POT meter can be enabled by invoking the set configuration utility, selecting the POT meter menu and then selecting the enable metering option. This routine will set the POT control field (POT indicator bit) to enable and set the POT count in NVRAM 74 to zero. It also sets the alarm locations in the RTC so that the alarm interrupt will be activated after length of time specified by the user's choice of granularity size. After this option is completed, the meter is enabled and initialized. Referring now to FIG. 12, there is shown a flow chart of the enable metering routine. The routine proceeds from step 275 to step 276 where a POT control field is set to enable. The POT control field is a single bit in NVRAM 74 and is used to indicate to POST that the POT meter is enabled. Next, the reset POT meter routine (see FIG. 11 above) is called and executed at step 277. The enable metering routine then returns to a point just after block 230 of FIG. 9 as shown at step 278.

The POT meter can be disabled by invoking the set configuration utility, selecting the POT meter menu and then selecting the terminate metering option. This routine will write zeros to all POT meter fields and indicators in NVRAM 74. In addition, the POT indicator bit is turned off and the alarm interrupt is disabled. This option allows those users who use the RTC alarm for another function to disable the system integrated POT meter when not required. It should be noted that this routine does not relinquish the POT meter locations in NVRAM 74 and the header is not destroyed. This is done so that if the meter is enabled once again, a second allocation is not required. The system 10 does not account for relinquishing an allocation in dynamic allocation.

Figure 13:
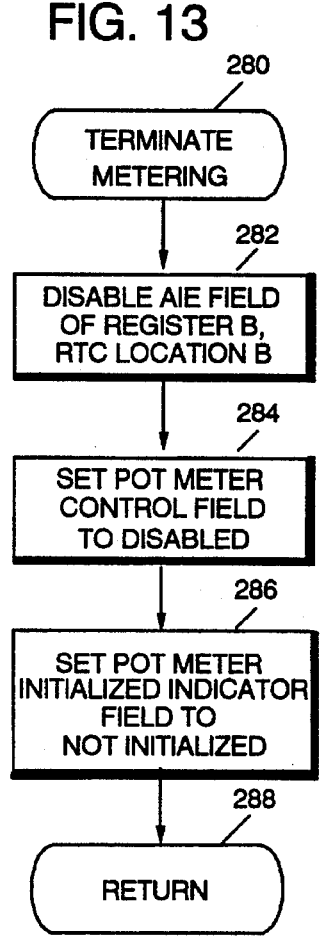
FIG. 13 is a flow chart showing the details of the terminate metering routine of the present invention.

Referring now to FIG. 13 the details of the terminate metering routine, steps 280 through steps 288, are shown. First, the AIE field of register B (RTC location B) is disabled at 282 by writing a logical zero to it. Next, the POT meter control field is disabled (logic 0) at 284. The routine proceeds to step 286 where the POT meter initialized field (indicator bit in NVRAM 74) is set to not initialized (logic 0). The routine then returns to a point just after block 230 of FIG. 9 as shown at step 288.

Figure 14:
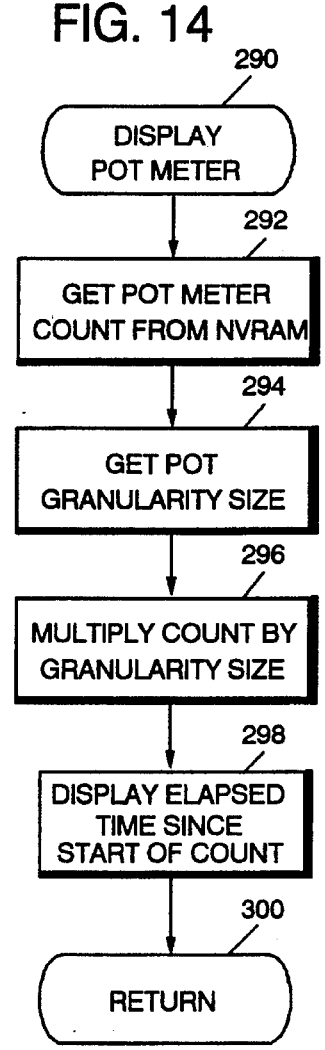
FIG. 14 is a flow chart showing the details of the display POT meter routine of the present invention.

The current power on time can be displayed by selecting the display POT meter option. This utility will convert the POT count in NVRAM 74 into actual elapsed time (in units specified by the user; minutes or hours and fractions thereof e.g., 4.56 minutes) and display it. Turning to FIG. 14, there is shown a flow chart of the routine that performs the display meter option. The routine proceeds from step 290 to step 292 where the current POT count is retrieved from NVRAM. Next, the granularity size (expressed in seconds, minutes or hours) is retrieved at 294. Execution proceeds to step 296 where the count is multiplied by the granularity size. The elapsed time in seconds, minutes or hours (depending on the granularity size) since the start of the count is then displayed (step 298). The routine then returns to a point just after block 230 of FIG. 9 as shown at step 300.

Figure 15:
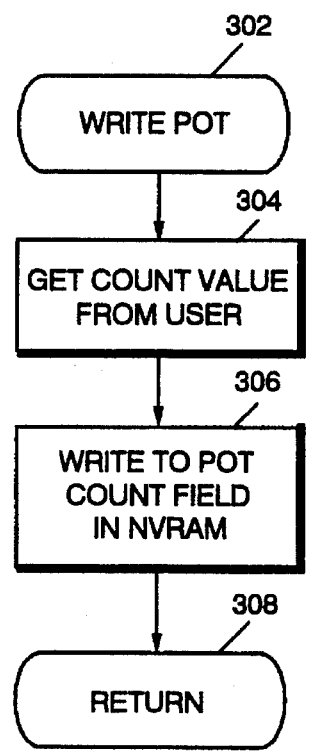
FIG. 15 is a flow chart showing the details of the write POT count routine of the present invention.

The write POT meter option prompts the user for the value to write to the POT meter and writes the value out to NVRAM 74. This option can be useful where for example, a user decided to enable the meter after it had already been powered on for a length of time that the user already knows. Referring now to FIG. 15, there is shown a flow chart of the routine that performs the write POT meter option. The routine proceeds from step 302 to step 304 where the user is prompted to enter a count value. Next, the entered granularity size is stored (written) to the POT count field in NVRAM 74 at 306. The routine then returns to a point just after block 230 of FIG. 9 as shown at step 308.

Another function available to the user is suspend metering. This function allows the user to suspend the metering. It will disable the alarm interrupt, but will not disturb any other user selected value of the POT meter in NVRAM 74. Referring now to FIG. 16, there is shown a flow chart of the routine that performs the suspend metering option. The routine proceeds from step 310 to step 312 where the POT control field in NVRAM 74 is cleared. Next, the AIE field of register B (RTC location B) is cleared at 314. The routine then returns to a point just after block 230 of FIG. 9. as shown at step 316.

A further function available to the user is resume metering which can be used after metering is suspended. This function will enable the alarm interrupt to allow the POST to continue counting power on time. It should be noted that the POT meter will not include elapsed time (power on time) while suspended. If an accurate count is required, it is necessary to manually time the suspension period, read the meter (FIG. 14) and write an update value back to the meter (FIG. 15). Referring now to FIG. 17, there is shown a flow chart of the routine that will resume metering. The routine proceeds from step 318 to step 320 where the POT control field is set to enable. Next, the AIE field of register B (RTC location B) is set (enabled) at 322. The routine then returns to a point just after block 230 of FIG. 9 as shown at step 324.

The POT meter of the present invention provides service personnel with a valuable tool in diagnosing intermittent error conditions. It can also be used by PC owners to collect usage statistics for maintenance and inventory strategies. The POT meter of the present invention is reliable, inexpensive and can be integrated into PCs to perform the function of a hardware power-on-time meter. Moreover, users or service personnel have the flexibility of selecting how often to update the POT, writing a known POT value or simply disabling the POT if it is believed it is interfering with the system's diagnosing process.

It should be noted that although the present invention was described using a granularity type and a granularity size, these two fields can be combined into one field and the units stored can be in seconds.

In another embodiment of the present invention, a terminate and stay resident (TSR) program can provide the POT meter functions to those computer systems which do not come equipped with the integrated POT meter described above. The operation of the TSR POT meter is very similar to the operation of the first embodiment (integrated meter) except for the differences that will described below. The program to be described can be for a DOS or DOS/Windows environment. A similar program can be developed for other operating systems such as, for example, OS/2, OS/2 Warp and AIX.

The TSR program can be copied onto the hard drive 31 of the computer system 10 and then transferred to DRAM 38 upon power on for execution. For a media-less system, (a system without a disk and diskette) the program will be copied into the media-less workstation partition on its associated server. In order to invoke the program automatically, the program's name is inserted into the AUTOEXEC.BAT file in the root directory of the boot disk (either the system reference diskette or the hard disk drive 31) or on the media-less workstation partition on its associated server. This will automatically invoke the program every time the system is powered on. This ensures an accurate record of elapsed time.

The TSR POT meter program includes an initialization section, a POT interrupt handler and a POT meter menu. The POT meter menu provides the user for this embodiment with the same eight options as the POT meter menu available with the set configuration utility when an integrated meter is present. The flow diagrams for the POT meter menu options for the TSR program are identical to the flow diagrams described above with regard to FIGS. 5–7 and 10–17 for the integrated POT meter. In addition, the POT interrupt handler for the TSR is identical in operation to the POT interrupt handler for the integrated meter described above with regard to FIG. 8.

Referring back to FIGS. 4A and 4B, and the dashed boxes shown therein, there is shown the procedure used by the TSR program in accordance with this embodiment of the present invention to initiate and establish a power-on-time (POT) meter to automatically keep track of power on time until canceled by a user. After POST is completed the operating system is booted at step 109. The TSR routine starts at 109 each time the computer system 10 is powered up or reset. Next, the routine checks whether the POT meter has been enabled. If the meter is not enabled then the NO branch is taken from decision step 106 to step 111 where system returns to the operating system.

On the other hand if the meter is enabled, the TSR routine will follow steps 112 through 142 (except step 140) as described above with regard to the integrated POT meter. In summary, these steps are used by the program to set up a timer using the alarm feature of the RTC in order to count the number of pre-selected time units the system is used (powered on) which is stored in NVRAM 74. The RTC alarm feature will activate an RTC interrupt (POT interrupt handler) every granularity cycle once initialized starting with the first, after powering up the system. After step 138 (or step 142) is completed the TSR program will go to step 139 (or step 143) where execution will return to the operating system and the program will stay resident. The TSR program will repeat the steps of FIGS. 4A and 4B each time the system is powered on.

In order to update the POT count in NVRAM 74, the TSR program will provide a POT interrupt handler. The program will chain the interrupt handler into the existing chain of interrupt handlers for the RTC. The POT interrupt handler will be invoked at each granularity cycle. As mentioned above, the flow chart for the POT interrupt handler for the TSR meter is identical to the flow chart of the integrated POT interrupt handler shown in FIG. 8. As described above, the POT interrupt handler is used to update the alarm to be activated at the next granularity cycle so that the interrupt handler will be entered each granularity cycle to update the POT count accordingly.

The TSR program will provide a user with a screen oriented user interface to allow the user to perform the following functions; 1) select metering granularity (type and size) (FIG. 10), 2) reset the POT meter (FIG. 11), 3) enable the POT meter (FIG. 12), 4) terminate or disable the POT meter (FIG. 13), 5) display the current POT meter value (FIG. 14), 6) write the POT meter (FIG. 15), 7) suspend metering (FIG. 16), 8) resume metering (FIG. 17).

Figure 18:
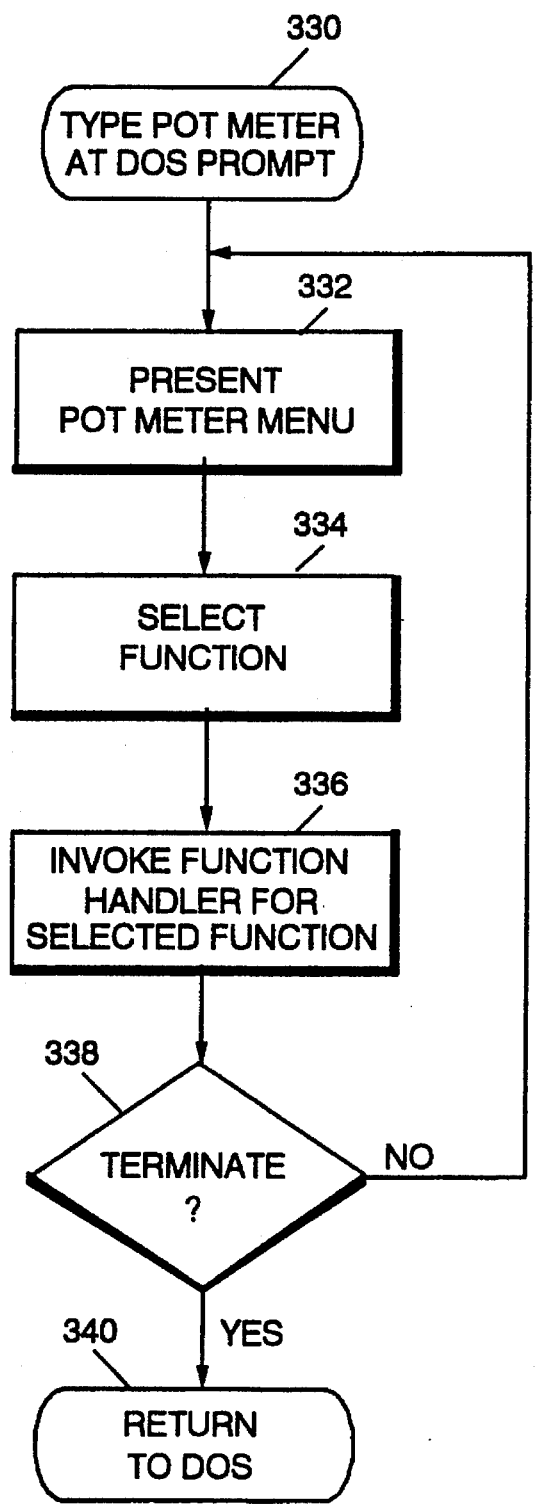
FIG. 18 is a flow chart showing the details of the TSR routine used to set up a user interface in accordance with another embodiment of the present invention.

FIG. 18 shows a flow diagram of the TSR program used to set up the user interface. This interface can be invoked by typing POTMETER at the DOS prompt and pressing the enter key as shown at step 330. Next, a POT meter menu (e.g., a pop up menu) will be presented to the user at 332. At step 334 the user selects one of the eight functions listed above. Next, the function handler for the selected function is invoked at 336.

After executing the selected function handler, execution will return to decision block 338 to check whether the user has decided to exit the POT meter menu. If the user does not terminate the NO branch is taken to step 332 and execution proceeds as described above with regard to steps 332 through 338. If the user exits, then the YES branch is taken from block 338 to block 340 where the program returns to the point it was at prior to the user invoking the POT meter menu.

When the POT meter menu is invoked, the user may select from among the eight options mentioned above. As also described above, the routine will proceed from step 336 of FIG. 17 to the particular function handler corresponding to the option selected by the user. The menu will allow the user to perform the same eight functions as the set configuration utility POT meter menu as defined above. The function handler flow charts for the eight options using a TSR program are identical to those shown in FIGS. 10–17.

In the drawings and specifications there has been set forth a preferred embodiment of the invention and, although specific terms are used, the description thus given uses terminology in a generic and descriptive sense only and not for purposes of limitation.

What is claimed is:

1. A personal computer system having a power on timer for recording an amount of time that said system is powered on, said system comprising:
   a high speed microprocessor coupled to a high speed data bus;
   a first non-volatile memory electrically coupled to a slower speed data bus for storing a pre-selected time unit and a power-on-time (POT) count of pre-selected time units that the system has been powered on,
   a bus controller coupled to said high speed data bus and said slower speed data bus for providing communications between the high speed data bus and the slower speed data bus;
   a non-volatile real time clock (RTC) coupled to said slower speed data bus having an alarm feature,
   means coupled to said slower speed data bus for performing a power-on-time routine at a power on of said system, said power-on-time routine characterized by its ability to set an alarm field of said RTC to be activated after the pre-selected time unit has elapsed and install a POT interrupt handler routine in a chain for RTC interrupts for incrementing the POT count at each passage of said pre-selected time unit while the system is powered on to obtain a POT count of said pre-selected time units that the system has been powered on.

2. The system according to claim 1, wherein said means comprises diagnostic means coupled to said slower speed data bus for storing a diagnostic routine which is executed at each power on or reset of said computer system and said POT routine is disposed within said diagnostic routine such that after a system configuration has been confirmed, said POT routine is executed.

3. The system according to claim 2, wherein said diagnostic means is stored in a second non-volatile memory coupled to said slower speed data bus.

4. The system according to claim 1, wherein said means comprises a terminate and stay resident program stored in a volatile memory coupled to said high speed data bus, said program being executed at a power on of said computer system.

5. The method according to claim 1, wherein said POT routine is further operative to execute a POT seconds, minutes, or hours routine for setting said alarm field of said RTC depending on whether said pre-selected time unit is in seconds, minutes or hours respectively.

6. The system according to claim 1, further including a volatile memory coupled to said high speed data bus for storing a display POT routine which is operative to retrieve the POT count from said first non-volatile memory, multiply said pre-selected time unit by said POT count to obtain an elapsed power on time, said system further comprising display means coupled to said slower speed data bus for displaying said elapsed power on time on a display of said computer system.

7. The system according to claim 1, further including a volatile memory coupled to said high speed data bus for storing a select granularity routine characterized by its ability to read the pre-selected time unit input by a user and store said pre-selected time unit in a granularity size field of said first non-volatile memory.

8. The system according to claim 1, further including a volatile memory coupled to said high speed data bus for storing a reset POT meter routine characterized by its ability to clear said POT count to zero in said first non-volatile memory, set the alarm field of said RTC to be activated after the pre-selected time unit has elapsed and installing a POT interrupt handler routine in a chain for RTC interrupts for incrementing the POT count at each passage of said pre-selected time unit while the system is powered on.

9. The system according to claim 8, further including a volatile memory coupled to said high speed data bus for storing an enable metering routine characterized by its ability to set a power on time control field in said first non-volatile memory to an enable state and execute said reset POT meter routine.

10. The system according to claim 1, further including a second non-volatile memory for storing said POT interrupt handler routine which will be executed at each passage of said pre-selected time unit while the system is powered on for incrementing the POT count at each passage of said pre-selected time unit to obtain a POT count of said pre-selected time units that the system has been powered on.

11. The system according to claim 1, further comprising input means coupled to said slower speed data bus for allowing a user to input said pre-selected time unit which is stored in said first non-volatile memory.

12. The system according to claim 8, wherein said pre-selected time unit is selected from the group consisting of seconds, minutes and hours.

13. A method for recording an amount of time that a personal computer system is powered on, said system comprising: a high speed microprocessor coupled to a high speed data bus; a first non-volatile memory electrically coupled to a slower speed data bus for storing a pre-selected time unit and a power on time count of pre-selected time units that the system has been powered on; a bus controller coupled to said high speed data bus and said slower speed data bus for providing communications between the high speed data bus and the slower speed data bus; a non-volatile real time clock (RTC) coupled to said slower speed data bus having an alarm feature; said method comprising the steps of:

1) activating a power on time meter routine at a power on of said computer system, 2) setting an alarm field of said RTC to be activated after a pre-selected time unit has elapsed, 3) installing a POT interrupt handler routine in a chain for RTC interrupts, 4) invoking said POT interrupt handler routine at each passage of said pre-selected time unit while the system is powered on for incrementing the POT count at each passage of said pre-selected time unit while the system is powered on to obtain a POT count of said pre-selected time units that the system has been powered on.

14. The method according to claim 13, wherein each of steps (1) through (4) are disposed within a diagnostic routine which is executed at each power on or reset of said computer system, said diagnostic routine being stored in a second non-volatile memory coupled to said slower speed data bus.

15. The method according to claim 14, wherein said step of activating said POT routine includes the step of determining whether said power-on-time routine is enabled and steps (1) through (4) are performed only in response to a determination that said POT meter was enabled.

16. The method according to claim 15, wherein said step of determining whether a POT meter function is enabled further includes the steps of:

determining whether a POT meter is initialized only in response to a determination that said POT meter is enabled, reserving an area in said first non-volatile memory to store a POT count of the pre-selected time units that the system has been powered on only in response to a determination that the POT was not initialized.

17. The method according to claim 13, wherein each of steps (1) through (4) are incorporated within a terminate and stay resident program stored in a volatile memory coupled to said high speed data bus, said program being executed at a power on of said computer system.

18. The method according to claim 13, wherein said step of setting an alarm of said RTC includes the steps of:

reading a time field of said non-volatile clock, adding said pre-selected time unit to said time field to obtain an updated set alarm time, writing the updated set alarm time to the alarm time set field of said non-volatile clock.

19. The method according to claim 13, wherein said step of setting an alarm of said RTC includes the steps of:

determining whether said pre-selected time unit is in seconds, minutes or hours.

20. The method according to claim 19, in response to a determination that said pre-selected time unit is in seconds, further comprising the steps of:

reading the seconds field of said non-volatile clock, reading the pre-selected time unit from said first non-volatile memory, adding said pre-selected time unit to said seconds field to obtain an alarm setting time in seconds, writing the alarm setting time to a seconds alarm time set field of said non-volatile clock.

21. The method according to claim 19, in response to a determination that said pre-selected time unit is in minutes, further comprising the steps of:

storing a zero to a seconds alarm field in said non-volatile clock, reading the minutes field of said non-volatile clock, reading the pre-selected time unit from said first non-volatile memory, adding said pre-selected time unit to said minutes field to obtain an alarm setting time in minutes, writing the alarm setting time to a minutes alarm time set field of said non-volatile clock.

22. The method according to claim 19, in response to a determination that said pre-selected time unit is in hours, further comprising the steps of:

reading the seconds and minutes fields of said non-volatile clock, writing said seconds and minutes field values to a seconds and a minutes alarm time set field of said non-volatile clock, reading the hours field of said non-volatile clock, reading the pre-selected time unit from said first non-volatile memory, adding said pre-selected time unit to said hours field to obtain an alarm setting time in hours, writing the alarm setting time to an hours alarm time set field of said non-volatile clock.

23. The method of claim 13, wherein said POT interrupt handler routine comprises the steps of:

determining whether an active alarm bit in one of the non-volatile clock's registers is set, incrementing said POT count only in response to a determination that said active alarm bit is set, reading a time field of said non-volatile clock, adding said pre-selected time unit to said time field to obtain an updated set alarm time, writing the updated set alarm time to the alarm time set field of said non-volatile clock.

24. The method of claim 13, further comprising the steps of:

retrieving the POT count from said first non-volatile memory;

multiplying said pre-selected time unit by said POT count to obtain an elapsed power on time, and displaying the elapsed power on time on a display of said computer system.

25. The method according to claim 13, further comprising the steps of:

reading a predetermined POT count input by a user, storing said predetermined POT count in a POT count field in said first non-volatile memory.

26. The method according to claim 13, further comprising the steps of:

reading a pre-selected time unit type input by a user, storing said pre-selected time unit type in a granularity type field of said first non-volatile memory, reading said pre-selected time unit size input by a user, storing said pre-selected time unit size in a granularity size field in said first non-volatile memory.

27. The method according to claim 13, further comprising the steps of:

clearing a power-on-time control field in said first non-volatile memory, clearing an active alarm bit in one of the non-volatile clock's registers.

28. The method according to claim 27, further comprising the steps of:

setting a power-on-time control field in said first non-volatile memory to an enable state, setting said active alarm bit to an enable state.

29. The method according to claim 13, further comprising the steps of:

setting a power-on-time control field in said first non-volatile memory to an enable state, executing a reset POT meter routine to set said POT count to zero and install a POT interrupt handler routine for incrementing the POT count at each passage of said pre-selected time unit.

30. The method according to claim 29, wherein said reset POT routine comprises the steps of:

clearing said POT count to zero in said first non-volatile memory, setting an alarm field of said RTC to be activated after a pre-selected time unit has elapsed, enabling an RTC interrupt in a programmable interrupt controller in order for the POT interrupt handler routine to be invoked at each passage of said pre-selected time unit while the system is powered on.

31. The method according to claim 13, further comprising the steps of:

clearing said POT count to zero in said first non-volatile memory, setting an alarm field of said RTC to be activated after a pre-selected time unit has elapsed, enabling an RTC interrupt in a programmable interrupt controller in order for the POT interrupt handler routine to be invoked at each passage of said pre-selected time unit while the system is powered on.

\* \* \* \* \*